US011969024B2

(12) United States Patent
Kuczaj

(10) Patent No.: US 11,969,024 B2
(45) Date of Patent: Apr. 30, 2024

(54) HEATED AEROSOL-GENERATING DEVICE AND METHOD FOR GENERATING AEROSOL WITH CONSISTENT PROPERTIES

(71) Applicant: Philip Morris Products S.A., Neuchatel (CH)

(72) Inventor: Arkadiusz Kuczaj, Colombier (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 18/301,735

(22) Filed: Apr. 17, 2023

(65) Prior Publication Data

US 2023/0248071 A1 Aug. 10, 2023

Related U.S. Application Data

(63) Continuation of application No. 16/446,451, filed on Jun. 19, 2019, now Pat. No. 11,666,099, which is a (Continued)

(30) Foreign Application Priority Data

Dec. 28, 2012 (EP) .................................... 12199708

(51) Int. Cl.
*A24F 40/57* (2020.01)
*A24F 40/20* (2020.01)
(Continued)

(52) U.S. Cl.
CPC ........... *A24F 40/57* (2020.01); *H05B 1/0225* (2013.01); *H05B 1/0244* (2013.01);
(Continued)

(58) Field of Classification Search
CPC .......... A24F 40/57; A24F 40/20; A24F 47/00; H05B 1/0225; H05B 1/0244; H05B 3/0014; H05B 2203/021
See application file for complete search history.

(56) References Cited

U.S. PATENT DOCUMENTS 4,981,522 A 1/1991 Nichols et al.
5,144,962 A 9/1992 Counts et al.
(Continued)

FOREIGN PATENT DOCUMENTS

CA 2886394 A1 * 7/2014 ............. A24F 40/20
CA 3031703 A1 * 2/2018 ........... A24B 15/165
(Continued)

OTHER PUBLICATIONS

Written Opinion of the International Searching Authority dated Apr. 30, 2014 in PCT/EP13/076967 filed Dec. 17, 2013.
(Continued)

*Primary Examiner* — Jean F Duverne
(74) *Attorney, Agent, or Firm* — Oblon, McClelland, Maier & Neustadt, L.L.P.

(57) ABSTRACT

A method of controlling aerosol production in an aerosol-generating device is provided, the device including: a heater including a heating element to heat an aerosol-forming substrate, and a power source to provide power to the element, the method including: providing power to the element; and controlling the power provided such that in a first phase, the power is provided to the element such that a temperature of the element increases from an initial temperature to a first target temperature, in a second phase, the power is provided such that the temperature reduces to a second target temperature lower than the first temperature, and in a third phase, the power is provided such that the temperature increases to a third temperature, the first phase being ended in response to the element reaching the first
(Continued)

target temperature or at a predetermined time following the element reaching the first target temperature.

20 Claims, 4 Drawing Sheets

Related U.S. Application Data continuation of application No. 15/496,774, filed on Apr. 25, 2017, now Pat. No. 10,624,393, which is a continuation of application No. 15/053,581, filed on Feb. 25, 2016, now Pat. No. 9,668,521, which is a continuation of application No. 14/414,778, filed as application No. PCT/EP2013/076967 on Dec. 17, 2013, now Pat. No. 9,498,000.

(51) Int. Cl.
*H05B 1/02* (2006.01)
*H05B 3/00* (2006.01)

(52) U.S. Cl.
CPC ............ *H05B 3/0014* (2013.01); *A24F 40/20* (2020.01); *H05B 2203/021* (2013.01)

(56) References Cited

U.S. PATENT DOCUMENTS

| | | | |
|---|---|---|---|
| 5,249,586 | A | 10/1993 | Morgan et al. |
| 5,692,291 | A | 12/1997 | Deevi et al. |
| 6,040,560 | A | 3/2000 | Fleischhauer et al. |
| 6,417,493 | B1 | 7/2002 | Bales et al. |
| 7,400,942 | B2 | 7/2008 | Cheng |
| 7,401,545 | B2 | 7/2008 | Hu et al. |
| 8,881,737 | B2 | 11/2014 | Collett et al. |
| 8,910,640 | B2 | 12/2014 | Sears et al. |
| 8,916,804 | B2 | 12/2014 | Shigetomi |
| 2003/0150451 | A1 | 8/2003 | Shayan |
| 2006/0157466 | A1 | 7/2006 | Miyazaki et al. |
| 2009/0095287 | A1 | 4/2009 | Emarlou |
| 2009/0095726 | A1 | 4/2009 | Song et al. |
| 2009/0133691 | A1 | 5/2009 | Yamada |
| 2009/0272379 | A1 | 11/2009 | Thorens et al. |
| 2010/0163063 | A1 | 7/2010 | Fernando et al. |
| 2010/0313901 | A1 | 12/2010 | Fernando |
| 2012/0231464 | A1 | 9/2012 | Yu et al. |
| 2013/0010916 | A1 | 1/2013 | Jang et al. |
| 2013/0104916 | A1 | 5/2013 | Bellinger et al. |
| 2013/0284192 | A1 | 6/2013 | Coursey |
| 2013/0306084 | A1 | 11/2013 | Flick |
| 2013/0319440 | A1 | 12/2013 | Capuano |
| 2014/0096782 | A1 | 4/2014 | Ampolini et al. |
| 2014/0144429 | A1 | 5/2014 | Wensley |
| 2014/0321837 | A1 | 10/2014 | Flick |

FOREIGN PATENT DOCUMENTS

| | | | | |
|---|---|---|---|---|
| CN | 1190335 | A | 8/1998 | |
| CN | 101522244 | A | 9/2009 | |
| CN | 102754924 | A | 10/2012 | |
| CN | 103404969 | A | 11/2013 | |
| DE | 10 2007 011 120 | | 9/2008 | |
| EP | 0 358 114 | | 3/1990 | |
| EP | 0 430 559 | A2 | 6/1991 | |
| EP | 2 468 118 | | 6/2012 | |
| EP | 2 609 821 | A1 | 7/2013 | |
| EP | 2 756 859 | A1 | 7/2014 | |
| JP | 3-112478 | A | 5/1991 | |
| JP | 3-232481 | A | 10/1991 | |
| JP | 11-164679 | A | 6/1999 | |
| JP | 2000-41654 | A | 2/2000 | |
| JP | WO 2008/015918 | A1 | 12/2009 | |
| JP | 2011-515093 | | 5/2011 | |
| JP | 2012-513750 | A | 6/2012 | |
| KR | 10-0636287 | B1 | 10/2006 | |
| KR | 10-2008-0059567 | A | 6/2008 | |
| KR | 10-1076144 | B1 | 10/2011 | |
| KR | 101076144 | B1 | 10/2011 | |
| KR | 10-1314895 | B1 | 10/2013 | |
| WO | WO 96/32854 | A2 | 10/1996 | |
| WO | WO 98/17131 | A1 | 4/1998 | |
| WO | WO 03/070031 | A1 | 8/2003 | |
| WO | 2009 118085 | | 10/2009 | |
| WO | WO 2011/033396 | A2 | 3/2011 | |
| WO | WO 2011/063970 | A1 | 6/2011 | |
| WO | WO 2012/065754 | A2 | 5/2012 | |
| WO | WO 2012/085203 | A1 | 6/2012 | |
| WO | 2012 109371 | | 8/2012 | |
| WO | WO 2012/164077 | A1 | 12/2012 | |
| WO | WO 2012/178028 | A2 | 12/2012 | |
| WO | WO 2013/060781 | A1 | 5/2013 | |
| WO | WO 2013/098397 | A2 | 7/2013 | |
| WO | WO 2013/148810 | A1 | 10/2013 | |
| WO | WO-2014040988 | A2 * | 3/2014 | ............ A24F 40/53 |
| WO | WO 2014/054035 | A1 | 4/2014 | |

OTHER PUBLICATIONS

International Search Report dated Apr. 30, 2014 in PCT/EP13/076967 filed Dec. 17, 2013.

Office Action dated Mar. 5, 2018 in Japanese Patent Application No. 2017-023191, English translation only, 11 pages.

Office Action dated Jul. 22, 2020 in corresponding Korean Patent Application No. 10-2015-7000838 (with English Translation), 10 pages.

Notice of Allowance dated Apr. 27, 2021 in Korean Patent Application No. 10-2015-7000838, 2 pages.

Notification of Reasons for Refusal dated Oct. 17, 2022 in Japanese Patent Application No. 2021-139756 filed on Aug. 30, 2021, (with translation, 12 pages).

Decision to Grant a Patent dated Mar. 13, 2023 (drafted on Mar. 6, 2023) in Patent Application No. 2021-139756 filed on Aug. 30, 2021, with translation, total 5 pages.

* cited by examiner

HEATED AEROSOL-GENERATING DEVICE AND METHOD FOR GENERATING AEROSOL WITH CONSISTENT PROPERTIES

CROSS REFERENCE TO RELATED APPLICATIONS

This application is a continuation of and claims benefit under 35 U.S.C. § 120 to U.S. application Ser. No. 16/446,451, filed Jun. 19, 2019, which is a continuation of and claims benefit under 35 U.S.C. § 120 to U.S. application Ser. No. 15/496,774, filed Apr. 25, 2017 (now U.S. Pat. No. 10,624,393), which is a continuation of and claims benefit under 35 U.S.C. § 120 to U.S. application Ser. No. 15/053,581, filed Feb. 25, 2016 (now U.S. Pat. No. 9,668,521), which is a continuation of and claims benefit under 35 U.S.C. § 120 to U.S. application Ser. No. 14/414,778, filed Jan. 14, 2015 (now U.S. Pat. No. 9,498,000), which is a U.S. National Stage application of PCT/EP2013/076967, filed on Dec. 17, 2013, and claims the benefit of priority under 35 U.S.C. § 119 from EP 12199708.4, filed on Dec. 28, 2012, the entire contents of each of which are incorporated herein by reference.

The present invention relates to an aerosol-generating device and method for generating an aerosol by heating an aerosol-forming substrate. In particular, the invention relates to a device and method for generating an aerosol from an aerosol-forming substrate with consistent and desirable properties over a period of continuous or repeated heating of the aerosol-forming substrate.

Aerosol-generating devices that operate by heating an aerosol forming substrate are known in the art and include, for example, heated smoking devices. WO2009/118085 describes a heated smoking device in which a substrate is heated to generate an aerosol while the temperature is controlled to be within a desirable temperature range to prevent combustion of the substrate.

It is desirable for aerosol-generating devices to be able to produce aerosol which is consistent over time. This is particularly the case when the aerosol is for human consumption, as in a heated smoking device. In devices in which an exhaustible substrate is heated continuously or repeatedly over time this can be difficult, as the properties of the aerosol forming substrate can change significantly with continuous or repeated heating, both in relation to the amount and distribution of aerosol-forming constituents remaining in the substrate and in relation to substrate temperature. In particular, a user of a continuous or repeated heating device can experience a fading of flavour, taste, and feel of the aerosol as the substrate is depleted of the aerosol former that coveys nicotine and, in certain cases, flavouring. Thus, a consistent aerosol delivery is provided over time such that the first delivered aerosol is substantially comparable to a final delivered aerosol during operation.

It is an object of the present disclosure to provide an aerosol-generating device and system that provides an aerosol that is more consistent in its properties over a period of continuous or repeated heating of an aerosol-forming substrate.

In a first aspect, the disclosure provides a method of controlling aerosol production in an aerosol-generating device, the device comprising:

- a heater comprising at least one heating element configured to heat an aerosol-forming substrate; and
- a power source for providing power to the heating element, comprising the steps of:

controlling the power provided to the heating element such that in a first phase power is provided such that the temperature of the heating element increases from an initial temperature to a first temperature, in a second phase power is provided such that the temperature of the heating element decreases to a second temperature lower than the first temperature and in a third phase power is provided such that the temperature of the heating element increases to a third temperature greater than the second temperature.

As used herein, an 'aerosol-generating device' relates to a device that interacts with an aerosol-forming substrate to generate an aerosol. The aerosol-forming substrate may be part of an aerosol-generating article, for example part of a smoking article. An aerosol-generating device may be a smoking device that interacts with an aerosol-forming substrate of an aerosol-generating article to generate an aerosol that is directly inhalable into a user's lungs thorough the user's mouth. An aerosol-generating device may be a holder.

As used herein, the term 'aerosol-forming substrate' relates to a substrate capable of releasing volatile compounds that can form an aerosol. Such volatile compounds may be released by heating the aerosol-forming substrate. An aerosol-forming substrate may conveniently be part of an aerosol-generating article or smoking article.

As used herein, the terms 'aerosol-generating article' and 'smoking article' refer to an article comprising an aerosol-forming substrate that is capable of releasing volatile compounds that can form an aerosol. For example, an aerosol-generating article may be a smoking article that generates an aerosol that is directly inhalable into a user's lungs through the user's mouth. An aerosol-generating article may be disposable. The term 'smoking article' is generally used hereafter. A smoking article may be, or may comprise, a tobacco stick.

Existing aerosol-generating devices that generate aerosol by heating a substrate repeatedly or continuously are typically controlled to achieve a single constant temperature over time. However, with heating, the aerosol-forming substrate becomes depleted, i.e. the amount of key aerosol constituents in the substrate is reduced, which means reduced aerosol generation for a given temperature. Furthermore, as the temperature in the aerosol-forming substrate reaches a steady state, aerosol delivery is reduced because thermodiffusion effects are reduced. As a result, delivery of aerosol, measured in terms of key aerosol constituents, such as nicotine in the case of heated smoking devices, is reduced over time. Increasing the temperature of the heating element during a final phase of the heating process reduces or prevents the reduction in aerosol delivery over time.

In this context, continuous or repeated heating means that the substrate or a portion of the substrate is heated to generate aerosol over a sustained period, typically more than 5 seconds and may extend to more than 30 seconds. In the context of a heated smoking device, or other device on which a user puffs to withdraw aerosol from the device, this means heating the substrate over a period containing a plurality of user puffs, so that aerosol is continuously generated, independent of whether a user is puffing on the device or not. It is in this context that depletion of the substrate becomes a significant issue. This is in contrast to flash heating, in which a separate substrate or portion of the substrate is heated for each user puff, so that no portion of the substrate is heated for more than one puff where a puff duration is approximately 2-3 seconds in length.

As used herein, the terms "puff" and "inhalation" are used interchangeably and are intended to mean the action of a user drawing an aerosol into their body through their mouth or nose. Inhalation includes the situation where an aerosol is drawn into the user's lungs, and also the situation where an aerosol is only drawn into the user's mouth or nasal cavity before being expelled from the user's body.

The first, second, and third temperatures are chosen such that aerosol is generated continuously during the first, second and third phases. The first, second, and third temperatures are preferably determined based on range of temperatures that correspond to the volatilization temperature of an aerosol former present in the substrate. For example, if glycerine is used as the aerosol former, then temperatures of no less than between 290 and 320 degrees centigrade (i.e., temperatures above boiling point of glycerine) are used. Power may be provided to the heating element during the second phase to ensure that the temperature does not fall below a minimum allowable temperature.

In a first phase the temperature of the heating element is raised to a first temperature at which aerosol is generated from the aerosol-forming substrate. In many devices and in heated smoking devices in particular, it is desirable to generate aerosol with the desired constituents as soon as possible after activation of the device. For a satisfactory consumer experience of a heated smoking device the "time to first puff" is considered to be critical. Consumers do not want to have to wait for a significant period following activation of the device before having a first puff. For this reason, in the first phase, power may be supplied to the heating element to raise it to the first temperature as quickly as possible. The first temperature may be selected to be within an allowable temperature range, but may be selected close to a maximum allowable temperature in order to generate a satisfactory amount of aerosol for initial delivery to the consumer. The delivery of aerosol may be diminished by condensation within the device during the initial period of device operation.

The allowable temperature range is dependent on the aerosol-forming substrate. The aerosol-forming substrate releases a range of volatile compounds at different temperatures. Some of the volatile compounds released from the aerosol-forming substrate are only formed through the heating process. Each volatile compound will be released above a characteristic release temperature. By controlling the maximum operation temperature to be below the release temperature of some of the volatile compounds, the release or formation of these constituents can be avoided. The maximum operation temperature can also be chosen to ensure that combustion of the substrate does not occur under normal operating conditions.

The allowable temperature range may have a lower bound of between 240 and 340 degrees centigrade and an upper bound of between 340 and 400 degrees centigrade and may preferably be between 340 and 380 degrees centigrade. The first temperature may be between 340 and 400 degrees centigrade. The second temperature may be between 240 and 340 degrees centigrade, and preferably between 270 and 340 degrees centigrade, and the third temperature may be between 340 and 400 degrees centigrade, and preferably between 340 and 380 degrees centigrade. A maximum operating temperature of any of the first, second, and third temperatures is preferably no more than a combustion temperature for undesirable compounds that are present in conventional, lit-end cigarettes or approximately 380 degrees centigrade.

The step of controlling the power provided to the heating element is advantageously performed so as to maintain the temperature of the heating element within the allowable or desired temperature range in the second phase and in the third phase.

There are a number of possibilities for determining when to transition from the first phase to the second phase and equally from the second phase to the third phase. In one embodiment, the first phase, second phase and third phase may each have a predetermined duration. In this embodiment, the time following activation of the device is used to determine when the second and third phases begin and end. As an alternative, the first phase may be ended as soon as the heating element reaches a first target temperature. In a further alternative, the first phase is ended based on a predetermined time following the heating element reaching a first target temperature. In another alternative the first phase and second phase may be ended based on the total energy delivered to the heating element following activation. In yet a further alternative, the device may be configured to detect user puffs, for example using a dedicated flow sensor, and the first and second phases may be ended following a predetermined number of puffs. It should be clear that a combination of these options may be used and may be applied to the transition between any two phases. It should also be clear that it is possible to have more than three distinct phases of operation of the heating element.

When the first phase is ended, the second phase begins and the power to the heating element is controlled so as to reduce the temperature of the heating element to a second temperature that is lower than the first temperature, but within the allowable temperature range. This reduction in temperature of the heating element is desirable because as the device and substrate warms, condensation is reduced and delivery of aerosol increased for a given heating element temperature. It may also be desirable to reduce heating element temperature following the first phase to reduce the likelihood of substrate combustion. In addition, reducing the heating element temperature reduces the amount of energy consumed by the aerosol-generating device. Moreover, varying the temperature of the heating element during operation of the device allows for a time-modulated thermal gradient to be introduced into the substrate.

In the third phase the temperature of the heating element is increased. As the substrate becomes more and more depleted during the third phase it may be desirable to increase the temperature continually. The increase in temperature of the heating element during the third phase compensates for the reduction in aerosol delivery due to substrate depletion and reduced thermodiffusion. However, the increase in the temperature of the heating element during the third phase may have any temporal profile desired and may depend on the device and substrate geometry, substrate composition and on the duration of the first and second phases. It is preferable for the temperature of the heating element to remain within the allowable range throughout the third phase. In one embodiment, the step of controlling the power to the heating element is performed so as to continuously increase the temperature of the heating element during the third phase.

The step of controlling the power to the heating element may comprise measuring a temperature of the heating element or a temperature proximate to the heating element to provide a measured temperature, performing a comparison of the measured temperature to a target temperature, and adjusting the power provided to the heating element based a result of the comparison. The target temperature preferably changes with time following activation of the device to provide the first, second and third phases. For example, during a first phase the target temperature may be a first target temperature, during a second phase the target temperature may be a second target temperature and during a third phase the target temperature may be a third target temperature, wherein the third target temperature progressively increases with time. It should be clear that the target temperature may be chosen to have any desired temporal profile within the constraints of the first, second and third phases of operation.

The heating element may be an electrically resistive heating element and the step of controlling the power provided to the heating element may comprise determining the electrical resistance of the heating element and adjusting the electrical current supplied to the heating element dependent on the determined electrical resistance. The electrical resistance of the heating element is indicative of its temperature and so the determined electrical resistance may be compared with a target electrical resistance and the power provided adjusted accordingly. A PID control loop may be used to bring the determined temperature to a target temperature. Furthermore, mechanisms for temperature sensing other than detecting the electrical resistance of the heating element may be used, such as bimetallic strips, thermocouples or a dedicated thermistor or electrically resistive element that is electrically separate to the heating element. These alternative temperature sensing mechanisms may be used in addition to or instead of determining temperature by monitoring the electrical resistance of the heating element. For example, a separate temperature sensing mechanism may be used in a control mechanism for cutting power to the heating element when the temperature of the heating element exceeds the allowable temperature range.

The method may further comprise the step of identifying a characteristic of the aerosol-forming substrate. The step of controlling the power may then be adjusted dependent on the identified characteristic. For example, different target temperatures may be used for different substrates.

In a second aspect of the invention, there is provided an electrically operated aerosol-generating device, the device comprising: at least one heating element configured to heat an aerosol-forming substrate to generate an aerosol; a power supply for supplying power to the heating element; and electric circuitry for controlling supply of power from the power supply to the at least one heating element, wherein the electric circuitry is arranged to:

control the power provided to the heating element such that in a first phase the temperature of the heating element increases from an initial temperature to a first temperature, in a second phase the temperature of the heating element drops below the first temperature and in a third phase the temperature of the heating element increases again, wherein power is continually supplied during the first, second and third phase.

The options for the duration of each of the phases and the temperature of the heating element during each of the phases is as described in relation to the first aspect. The electric circuitry may be configured such that each of the first phase, second phase and third phase has a fixed duration. The electric circuitry may be configured to control the power provided to the heating element so as to continuously increase the temperature of the heating element during the third phase.

The circuitry may be arranged to provide power to the heating element as pulses of electric current. The power provided to the heating element may then be adjusted by adjusting the duty cycle of the electric current. The duty cycle may be adjusted by altering the pulse width, or the frequency of the pulses or both. Alternatively, the circuitry may be arranged to provide power to the heating element as a continuous DC signal.

The electric circuitry may comprise a temperature sensing means configured to measure a temperature of the heating element or a temperature proximate to the heating element to provide a measured temperature, and may be configured to perform a comparison of the measured temperature to a target temperature, and adjust the power provided to the heating element based a result of the comparison. The target temperature may be stored in an electronic memory and preferably changes with time following activation of the device to provide the first, second and third phases.

The temperature sensing means may be a dedicated electric component, such as a thermistor, or may be circuitry configured to determine temperature based on an electrical resistance of the heating element.

The electric circuitry may further comprise a means for identifying a characteristic of an aerosol-forming substrate in the device and a memory holding a look-up table of power control instructions and corresponding aerosol-forming substrate characteristics.

In both the first and second aspects of the invention, the heating element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

In both the first and second aspects of the invention, the aerosol-generating device may comprise an internal heating element or an external heating element, or both internal and external heating elements, where "internal" and "external" refer to the aerosol-forming substrate. An internal heating element may take any suitable form. For example, an internal heating element may take the form of a heating blade. Alternatively, the internal heater may take the form of a casing or substrate having different electro-conductive portions, or an electrically resistive metallic tube. Alternatively, the internal heating element may be one or more heating needles or rods that run through the centre of the aerosol-forming substrate. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

An external heating element may take any suitable form. For example, an external heating element may take the form of one or more flexible heating foils on a dielectric substrate, such as polyimide. The flexible heating foils can be shaped to conform to the perimeter of the substrate receiving cavity. Alternatively, an external heating element may take the form of a metallic grid or grids, a flexible printed circuit board, a moulded interconnect device (MID), ceramic heater, flexible carbon fibre heater or may be formed using a coating technique, such as plasma vapour deposition, on a suitable shaped substrate. An external heating element may also be formed using a metal having a defined relationship between temperature and resistivity. In such an exemplary device, the metal may be formed as a track between two layers of suitable insulating materials. An external heating element formed in this manner may be used to both heat and monitor the temperature of the external heating element during operation.

The internal or external heating element may comprise a heat sink, or heat reservoir comprising a material capable of absorbing and storing heat and subsequently releasing the heat over time to the aerosol-forming substrate. The heat sink may be formed of any suitable material, such as a suitable metal or ceramic material. In one embodiment, the material has a high heat capacity (sensible heat storage material), or is a material capable of absorbing and subsequently releasing heat via a reversible process, such as a high temperature phase change. Suitable sensible heat storage materials include silica gel, alumina, carbon, glass mat, glass fibre, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, a mixture of eutectic salts or an alloy. The heat sink or heat reservoir may be arranged such that it is directly in contact with the aerosol-forming substrate and can transfer the stored heat directly to the substrate. Alternatively, the heat stored in the heat sink or heat reservoir may be transferred to the aerosol-forming substrate by means of a heat conductor, such as a metallic tube.

The heating element advantageously heats the aerosol-forming substrate by means of conduction. The heating element may be at least partially in contact with the substrate, or the carrier on which the substrate is deposited. Alternatively, the heat from either an internal or external heating element may be conducted to the substrate by means of a heat conductive element.

In both the first and second aspects of the invention, during operation, the aerosol-forming substrate may be completely contained within the aerosol-generating device. In that case, a user may puff on a mouthpiece of the aerosol-generating device. Alternatively, during operation a smoking article containing the aerosol-forming substrate may be partially contained within the aerosol-generating device. In that case, the user may puff directly on the smoking article. The heating element may be positioned within a cavity in the device, wherein the cavity is configured to receive an aerosol-forming substrate such that in use the heating element is within the aerosol-forming substrate.

The smoking article may be substantially cylindrical in shape. The smoking article may be substantially elongate. The smoking article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The smoking article may have a total length between approximately 30 mm and approximately 100 mm. The smoking article may have an external diameter between approximately 5 mm and approximately 12 mm. The smoking article may comprise a filter plug. The filter plug may be located at the downstream end of the smoking article. The filter plug may be a cellulose acetate filter plug. The filter plug is approximately 7 mm in length in one embodiment, but may have a length of between approximately 5 mm to approximately 10 mm.

In one embodiment, the smoking article has a total length of approximately 45 mm. The smoking article may have an external diameter of approximately 7.2 mm. Further, the aerosol-forming substrate may have a length of approximately 10 mm. Alternatively, the aerosol-forming substrate may have a length of approximately 12 mm. Further, the diameter of the aerosol-forming substrate may be between approximately 5 mm and approximately 12 mm. The smoking article may comprise an outer paper wrapper. Further, the smoking article may comprise a separation between the aerosol-forming substrate and the filter plug. The separation may be approximately 18 mm, but may be in the range of approximately 5 mm to approximately 25 mm. The separation is preferably filled in the smoking article by a heat exchanger that cools the aerosol as it passes through the smoking article from the substrate to the filter plug. The heat exchanger may be, for example, a polymer based filter, for example a crimped PLA material.

In both the first and second aspects of the invention, the aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise comminuting one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

Although reference is made to solid aerosol-forming substrates above, it will be clear to one of ordinary skill in the art that other forms of aerosol-forming substrate may be used with other embodiments. For example, the aerosol-forming substrate may be a liquid aerosol-forming substrate. If a liquid aerosol-forming substrate is provided, the aerosol-generating device preferably comprises means for retaining the liquid. For example, the liquid aerosol-forming substrate may be retained in a container. Alternatively or in addition, the liquid aerosol-forming substrate may be absorbed into a porous carrier material. The porous carrier material may be made from any suitable absorbent plug or body, for example, a foamed metal or plastics material, polypropylene, terylene, nylon fibres or ceramic. The liquid aerosol-forming substrate may be retained in the porous carrier material prior to use of the aerosol-generating device or alternatively, the liquid aerosol-forming substrate material may be released into the porous carrier material during, or immediately prior to use. For example, the liquid aerosol-forming substrate may be provided in a capsule. The shell of the capsule preferably melts upon heating and releases the liquid aerosol-forming substrate into the porous carrier material. The capsule may optionally contain a solid in combination with the liquid.

Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

In both the first and second aspects of the invention, the aerosol-generating device may further comprise a power supply for supplying power to the heating element. The power supply may be any suitable power supply, for example a DC voltage source. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

In a third aspect of the invention, there is provided electric circuitry for an electrically operated aerosol-generating device, the electric circuitry being arranged to perform the method of the first aspect of the invention.

In a fourth aspect of the invention there is provided a computer program which, when run on programmable electric circuitry for an electrically operated aerosol-generating device, causes the programmable electric circuitry to perform the method of the first aspect of the invention. In a fifth aspect of the invention, there is provided a computer readable storage medium having stored thereon a computer program according to the fourth aspect of the invention.

Although the disclosure has been described by reference to different aspects, it should be clear that features described in relation to one aspect of the disclosure may be applied to the other aspects of the disclosure.

Embodiments of the invention will now be described in detail, by way of example only, with reference to the accompanying drawings, in which.

Figure 1:
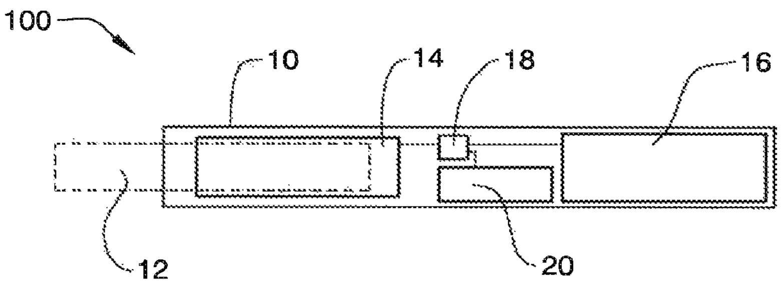
FIG. 1 is a schematic illustration of an electrically heated smoking device in accordance with the invention.

In FIG. 1, the components of an embodiment of an electrically heated aerosol-generating device 100 are shown in a simplified manner. Particularly, the elements of the electrically heated aerosol-generating device 100 are not drawn to scale in FIG. 1. Elements that are not relevant for the understanding of this embodiment have been omitted to simplify FIG. 1.

The electrically heated aerosol-generating device 100 comprises a housing 10 and an aerosol-forming substrate 12, for example a cigarette. The aerosol-forming substrate 12 is pushed inside the housing 10 to come into thermal proximity with the heating element 14. The aerosol-forming substrate 12 will release a range of volatile compounds at different temperatures. By controlling the operation temperature of the electrically heated aerosol-generating device 100 to be below the release temperature of some of the volatile compounds, the release or formation of these smoke constituents can be avoided.

Within the housing 10 there is an electrical energy supply 16, for example a rechargeable lithium ion battery. A controller 18 is connected to the heating element 14, the electrical energy supply 16, and a user interface 20, for example a button or display. The controller 18 controls the power supplied to the heating element 14 in order to regulate its temperature. Typically the aerosol-forming substrate is heated to a temperature of between 250 and 450 degrees centigrade.

Figure 2:
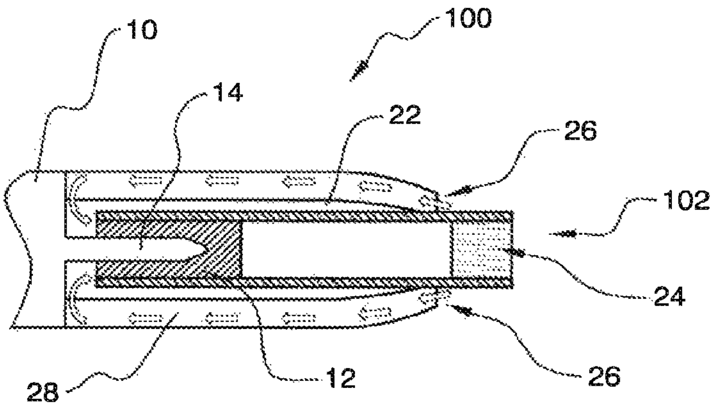
FIG. 2 is a schematic cross-section of the front end of a first embodiment of a device of the type shown in FIG. 1.

In the described embodiment the heating element 14 is an electrically resistive track or tracks deposited on a ceramic substrate. The ceramic substrate is in the form of a blade and is inserted into the aerosol-forming substrate 12 in use. FIG. 2 is a schematic representation of the front end of the device and illustrates the air flow through the device. It is noted that FIG. 2 does not accurately depict the relative scale of elements of the device. A smoking article 102, including an aerosol forming substrate 12 is received within the cavity 22 of the device 100. Air is drawn into the device by the action of a user sucking on a mouthpiece 24 of the smoking article 102. The air is drawn in through inlets 26 forming in a proximal face of the housing 10. The air drawn into the device passes through an air channel 28 around the outside of the cavity 22. The drawn air enters the aerosol-forming substrate 12 at the distal end of the smoking article 102 adjacent a proximal end of a blade shaped heating element 14 provided in the cavity 22. The drawn air proceeds through the aerosol-forming substrate 12, entraining the aerosol, and then to the mouth end of the smoking article 102. The aerosol-forming substrate 12 is a cylindrical plug of tobacco based material.

Figure 3:
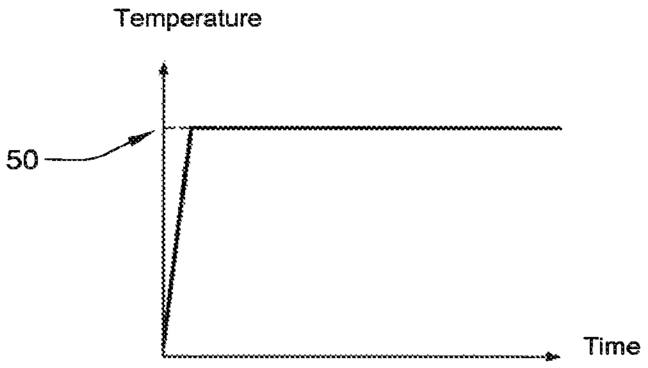
FIG. 3 is a schematic illustration of a flat temperature profile for a heating element.
Figure 4:
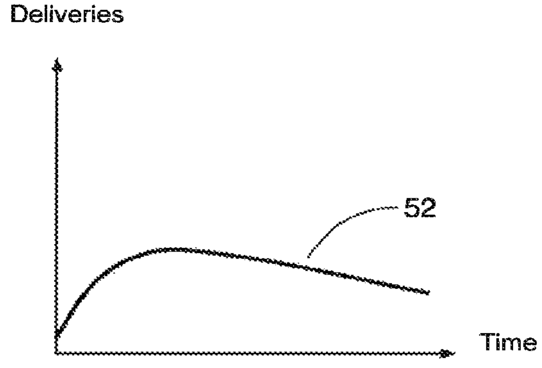
FIG. 4 is a schematic illustration of reducing aerosol delivery with a flat a temperature profile.

Current aerosol-generating devices are configured to provide a constant temperature during operation, as illustrated in FIG. 3. Following activation of the device power is delivered to the heating element until a target temperature 50 is reached. Once the target temperature 50 has been reached, the heating element is maintained at that temperature until the device is deactivated. FIG. 4 is a schematic illustration of the delivery of a key aerosol constituent using a flat temperature profile as shown in FIG. 3. The line 52 represents the amount of the key aerosol constituent, such as glycerol or nicotine, being delivered during the activation of the device. It can be seen that the delivery of the constituent peaks and then falls with time as the substrate become depleted and thermodiffusion effects weaken.

Figure 5:
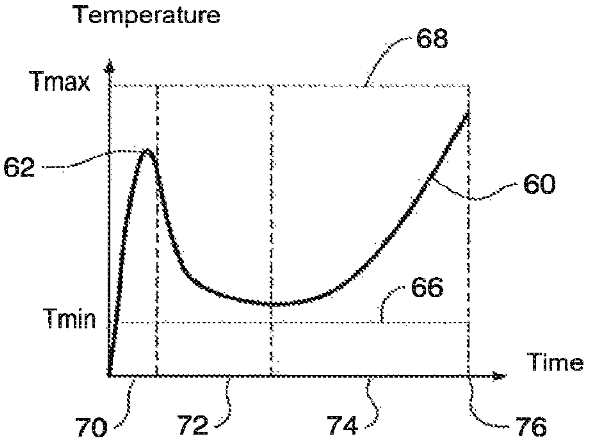
FIG. 5 is a schematic illustration of a temperature profile for a heating element in accordance with an embodiment of the invention.

FIG. 5 is schematic illustration of a temperature profile for a heating element in accordance with an embodiment of the present invention. Line 60 represents the temperature of the heating element over time.

In a first phase 70, the temperature of the heating element is raised from an ambient temperature to a first temperature 62. The temperature 62 is within an allowable temperature range between a minimum temperature 66 and a maximum temperature 68. The allowable temperature change is set so that desired volatile compounds are vaporised from the substrate but undesirable compounds, which are vaporised at higher temperatures, are not vaporised. The allowable temperature range is also below the temperature at which combustion of the substrate could occur under normal operation conditions, i.e. normal temperature, pressure, humidity, user puff behaviour and air composition.

In a second phase 72, the temperature of the heating element is reduced to a second temperature 64. The second temperature 64 is within the allowable temperature range but is lower than the first temperature.

In a third phase 74, the temperature of the heating element is progressively increased until a deactivation time 76. The temperature of the heating element remains within the allowable temperature range throughout the third phase.

Figure 6:
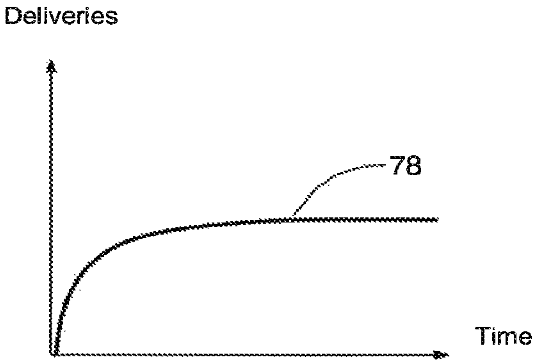
FIG. 6 is a schematic illustration of a constant aerosol delivery in accordance with an embodiment of the invention.

FIG. 6 is a schematic illustration of the delivery profile of a key aerosol constituent with the heating element temperature profile as illustrated in FIG. 5. After an initial increase in delivery following activation of the heating element, the delivery stays constant until the heating element is deactivated. The increasing temperature in the third phase compensates for the depletion of the substrate's aerosol former.

Figure 7:
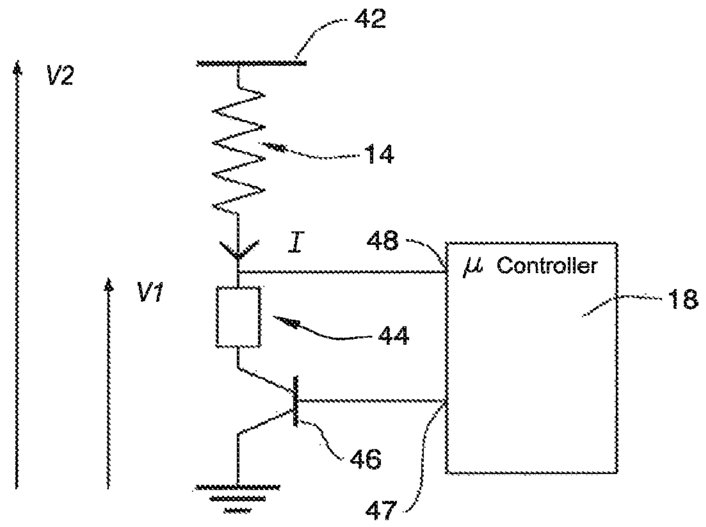
FIG. 7 illustrates control circuitry used to provide temperature regulation of a heating element in accordance with one embodiment of the invention.

FIG. 7 illustrates control circuitry used to provide the described temperature profile in accordance with one embodiment of the invention.

The heater 14 is connected to the battery through connection 42. The battery (not shown in FIG. 7) provides a voltage V2. In series with the heating element 14, an additional resistor 44, with known resistance r, is inserted and connected to voltage V1, intermediate between ground and voltage V2. The frequency modulation of the current is controlled by the microcontroller 18 and delivered via its analog output 47 to the transistor 46 which acts as a simple switch.

The regulation is based on a PID regulator that is part of the software integrated in the microcontroller 18. The temperature (or an indication of the temperature) of the heating element is determined by measuring the electrical resistance of the heating element. The determined temperature is used to adjust the duty cycle, in this case the frequency modulation, of the pulses of current supplied to the heating element in order to maintain the heating element at a target temperature or adjust the temperature of the heating element towards a target temperature. The temperature is determined at a frequency chosen to match the control of the duty cycle, and may be determined as often as once every 100 ms.

The analog input 48 on the microcontroller 18 is used to collect the voltage across the resistance 44 and provides the image of the electrical current flowing in the heating element. The battery voltage V+ and the voltage across resistor 44 are used to calculate the heating element resistance variation and or its temperature.

The heater resistance to be measured at a particular temperature is $R_{heater}$. In order for microprocessor 18 to measure the resistance $R_{heater}$ of the heater 14, the current through the heater 14 and the voltage across the heater 14 can both be determined. Then, the following well-known formula can be used to determine the resistance:

$$V=IR \tag{1}$$

In FIG. 6, the voltage across the heater is V2−V1 and the current through the heater is I. Thus:

$$R_{heater} = \frac{V2 - V1}{I} \tag{2}$$

The additional resistor 44, whose resistance r is known, is used to determine the current I, again using (1) above. The current through the resistor 44 is I and the voltage across the resistor 24 is V1. Thus:

$$I = \frac{V1}{r} \tag{3}$$

So, combining (2) and (3) gives:

$$R_{heater} = \frac{(V2 - V1)}{V1} r \tag{4}$$

Thus, the microprocessor 18 can measure V2 and V1, as the aerosol-generating system is being used and, knowing the value of r, can determine the heater's resistance at a particular temperature, $R_{heater}$.

The heater resistance is correlated to temperature. A linear approximation can be used to relate the temperature T to the measured resistance $R_{heater}$ at temperature T according to the following formula:

$$T = \frac{R_{heater}}{AR_0} + T_0 - \frac{1}{A} \quad (5)$$

where A is the thermal resistivity coefficient of the heating element material and Ro is the resistance of the heating element at room temperature $T_0$.

Other, more complex, methods for approximating the relationship between resistance and temperature can be used if a simple linear approximation is not accurate enough over the range of operating temperatures. For example, in another embodiment, a relation can be derived based on a combination of two or more linear approximations, each covering a different temperature range. This scheme relies on three or more temperature calibration points at which the resistance of the heater is measured. For temperatures intermediate the calibration points, the resistance values are interpolated from the values at the calibration points. The calibration point temperatures are chosen to cover the expected temperature range of the heater during operation.

An advantage of these embodiments is that no temperature sensor, which can be bulky and expensive, is required. Also the resistance value can be used directly by the PID regulator instead of temperature. The resistance value is directly correlated to the temperature of the heating element, asset out in equation (5). Accordingly, if the measured resistance value is within a desired range, so too will the temperature of the heating element. Accordingly the actual temperature of the heating element need not be calculated. However, it is possible to use a separate temperature sensor and connect that to the microcontroller to provide the necessary temperature information.

Figure 8:
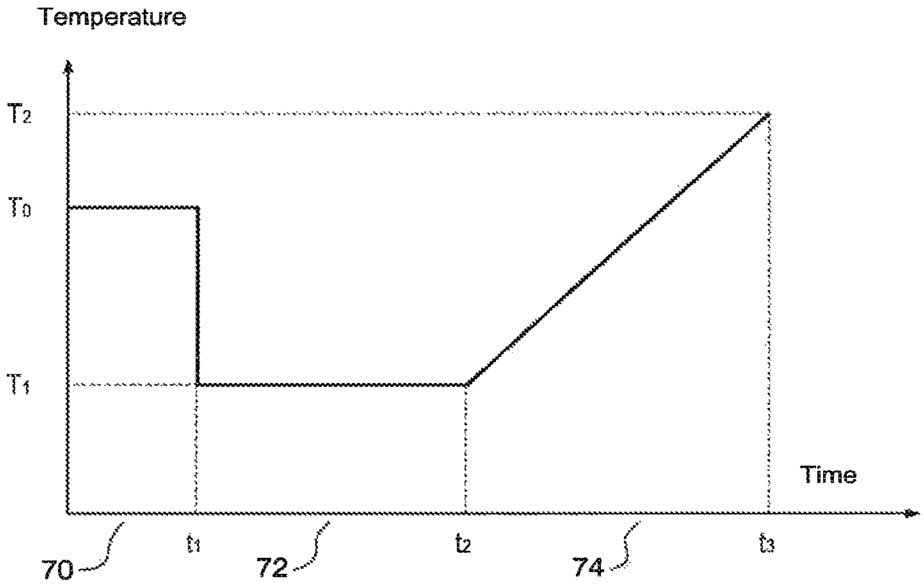
FIG. 8 illustrates some alternative target temperature profiles in accordance with the present invention.

FIG. 8 illustrates an example target temperature profile, in which the three phases of operation can be clearly seen. In a first phase 70, the target temperature is set at $T_0$. Power is provided to the heating element to increase the temperature of the heating element to $T_0$ as quickly as possible. As described a PID regulator is used to maintain the temperature of the heating element as close to the target temperature as possible throughout operation of the device. At time $t_1$ the target temperature is changed to $T_1$, which means that the first phase 70 is ended and the second phase begins. The target temperature is maintained at $T_1$ until time $t_2$. At time $t_2$ the second phase is ended at the third phase 74 is begun. During the third phase 74, the target temperature is linearly increased with increasing time until time $t_3$, at which time the target temperature is $T_2$ and power is no longer supplied to the heating element.

A target temperature profile of the shape shown in FIG. 8 gives rise to an actual temperature profile of the shape shown in FIG. 5. The values of $T_0$, $T_1$, $T_2$ can be adjusted to suit particular substrates and particular device, heating element and substrate geometries. Similarly the values of $t_1$, $t_2$, and $t_3$ can selected to suit the circumstances.

In one example, the first phase is 45 seconds long and $T_0$ is set at 360° C., the second phase is 145 seconds long and $T_1$ is 320° C., and the third phase is 170 seconds long and $T_3$ is 380° C. The smoking experience lasts for a total of 360 seconds.

In another example, the first phase is 60 seconds long and $T_0$ is set at 340° C., the second phase is 180 seconds long and $T_1$ is 320° C., and the third phase is 120 seconds long and $T_3$ is 360° C. Again, the heating cycle or smoking experience lasts for a total of 360 seconds.

In yet another example, the first phase is 30 seconds long and $T_0$ is set at 380° C., the second phase is 110 seconds long and $T_1$ is 300° C., and the third phase is 220 seconds long and $T_3$ is 340° C.

The duration and temperature targets for each phase of operation are stored in memory within the controller 18. This information may be part of the software executed by the microcontroller. However, it may be stored in a look-up table so that different profiles can be selected by the microcontroller. The consumer may select different profiles via user interface based on user preference or based on the particular substrate being heated. The device may include means for identifying the substrate, such as an optical reader, and a heating profile automatically selected based on the identified substrate.

In another embodiment only the target temperatures $T_0$, $T_1$, and $T_2$ are stored in memory and the transition between the phases is triggered by puff counts. For example, the microcontroller may receive puff count data from a flow sensor and may be configured to end the first phase after two puffs and end the second phase after a further five puffs.

Each of the embodiments described above results in a more even delivery of aerosol over the course of the heating of the substrate when compared to a flat heating profile as illustrated in FIG. 3. The optimal heating profile depends on several factors and can be determined experimentally for a given device and substrate geometry and substrate composition. For example, the device may include more than one heating element and the arrangement of the heating elements will influence the depletion of the substrate and thermodiffusion effects. Each heating element may be controlled to have a different heating profile. The shape and size of the substrate in relation to the heating element may also be a significant factor.

It should be clear that, the exemplary embodiments described above illustrate but are not limiting. In view of the above discussed exemplary embodiments, other embodiments consistent with the above exemplary embodiments will now be apparent to one of ordinary skill in the art.

I claim:

1. A method of controlling aerosol production in an aerosol-generating device, the aerosol-generating device comprising:

- a heater comprising at least one heating element configured to heat an aerosol-forming substrate, and
- a power source configured to provide power to the at least one heating element, the method comprising:

- providing power to the at least one heating element; and
- controlling the power provided to the at least one heating element such that
  - in a first phase, the power is provided to the at least one heating element such that a temperature of the at least one heating element increases from an initial temperature to a first target temperature,
  - in a second phase, the power is provided to the at least one heating element such that the temperature of the at least one heating element reduces to a second target temperature, the second target temperature being lower than the first temperature, and
  - in a third phase, the power is provided to the at least one heating element such that the temperature of the at least one heating element increases to a third temperature, wherein the first phase is ended in response to the at least one heating element reaching the first target temperature or at a predetermined time following the at least one heating element reaching the first target temperature.

2. The method of controlling aerosol production according to claim 1, wherein the step of controlling the power provided to the at least one heating element is performed so as to maintain the temperature of the at least one heating element within a desired temperature range in the second phase and in the third phase.

3. The method of controlling aerosol production according to claim 2, wherein the desired temperature range is above a volatilization temperature of an aerosol former present in the substrate.

4. The method of controlling aerosol production according to claim 1, wherein the first target temperature is between 240 degrees centigrade and 340 degrees centigrade.

5. The method of controlling aerosol production according to claim 1, wherein the second phase or third phase has a predetermined duration.

6. The method of controlling aerosol production according to claim 1, further comprising providing power to the heating element in the first phase, the second phase, and the third phase, independent of whether a user is puffing on the system.

7. The method of controlling aerosol production according to claim 1, further comprising activating the aerosol-generating device by supplying power to the at least one heating element, wherein the first phase immediately follows activation of the device.

8. The method of controlling aerosol production according to claim 1, the aerosol-generating device further comprising a flow sensor configured to detect a number of user puffs on the aerosol-generating device, and the method further comprising detecting the number of user puffs on the aerosol-generating device, wherein the second phase or the third phase is ended following detection of a predetermined number of user puffs.

9. The method of controlling aerosol production according to claim 1, wherein the step of controlling the power to the heating element is performed so as to continuously increase the temperature of the heating element during the third phase.

10. The method of controlling aerosol production according to claim 1, further comprising generating an aerosol from the aerosol-generating device during each of the first phase, the second phase, and the third phase.

11. An electrically operated aerosol-generating device, comprising:

at least one heating element configured to heat an aerosol-forming substrate to generate an aerosol;

a power supply configured to provide power to the at least one heating element; and electric circuitry configured to control a supply of power from the power supply to the at least one heating element, wherein the electric circuitry is further configured to control the power provided to the at least one heating element such that in a first phase, a temperature of the at least one heating element increases from an initial temperature to a first target temperature, in a second phase, the temperature of the at least one heating element reduces to a second target temperature, the second target temperature being lower than the first temperature, and in a third phase, the temperature of the at least one heating element increases to a third temperature, wherein the first phase is ended in response to the at least one heating element reaching the first target temperature or at a predetermined time following the at least one heating element reaching the first target temperature.

12. The electrically operated aerosol-generating device according to claim 11, wherein the electric circuitry is configured to control the supply of power from the power supply to the at least one heating element so as to continuously increase the temperature of the heating element during the third phase.

13. The electrically operated aerosol-generating device according to claim 11, further comprising a means for detecting user puffs on the aerosol-generating device, wherein the electric circuitry is further configured such that at least one of the second and third phase is ended following detection of a predetermined number of user puffs.

14. The electrically operated aerosol-generating device according to claim 11, wherein the aerosol-generating device generates an aerosol during each of the first phase, the second phase, and the third phase.

15. The electrically operated aerosol-generating device according to claim 11, wherein the at least one heating element is positioned within a cavity in the device, and wherein the cavity is configured to receive the aerosol-forming substrate.

16. Electric circuitry for an electrically operated aerosol-generating device, the electric circuitry being configured to perform a method of controlling aerosol production in the electrically operated aerosol-generating device, the electrically operated aerosol-generating device comprising:

a heater comprising at least one heating element configured to heat an aerosol-forming substrate, and a power source configured to provide power to the at least one heating element, the method comprising:

providing power, by the electric circuitry, to the at least one heating element; and controlling, by the electric circuitry, the power provided to the at least one heating element such that in a first phase, the power is provided to the at least one heating element such that a temperature of the at least one heating element increases from an initial temperature to a first target temperature, in a second phase, the power is provided to the at least one heating element such that the temperature of the at least one heating element reduces to a second target temperature, the second target temperature being lower than the first temperature, and in a third phase, the power is provided to the at least one heating element such that the temperature of the at least one heating element increases to a third temperature, wherein the first phase is ended in response to the at least one heating element reaching the first target temperature or at a predetermined time following the at least one heating element reaching the first target temperature.

17. The electric circuitry according to claim 16, wherein the aerosol-forming substrate is heated during each of the first phase, the second phase, and the third phase.

18. The electric circuitry according to claim 16, further comprising generating an aerosol from the aerosol-generating device during each of the first phase, the second phase, and the third phase.

19. A nontransitory computer-readable storage medium having a computer program stored thereon, which, when run on programmable electric circuitry for an electrically operated aerosol-generating device, causes the programmable electric circuitry to perform a method of controlling aerosol production in an aerosol-generating device, the device comprising:

a heater comprising at least one heating element configured to heat an aerosol-forming substrate, and a power source configured to provide power to the at least one heating element, the method comprising:

providing power to the at least one heating element; and controlling the power provided to the at least one heating element such that in a first phase, the power is provided to the at least one heating element such that a temperature of the at least one heating element increases from an initial temperature to a first target temperature, in a second phase, the power is provided to the at least one heating element such that the temperature of the at least one heating element reduces to a second target temperature, the second target temperature being lower than the first temperature, and in a third phase, the power is provided to the at least one heating element such that the temperature of the at least one heating element increases to a third temperature, wherein the first phase is ended in response to the at least one heating element reaching the first target temperature or at a predetermined time following the at least one heating element reaching the first target temperature.

20. The nontransitory computer-readable storage medium according to claim 19, which, when run on the programmable electric circuitry for the electrically operated aerosol-generating device, causes the programmable electric circuitry to perform the method of controlling aerosol production in the aerosol-generating device, the method further comprising generating an aerosol from the aerosol-generating device during each of the first phase, the second phase, and the third phase, wherein the aerosol-forming substrate is heated during each of the first phase, the second phase, and the third phase.

* * * * *